L. ERICSON.
IGNITION DISTRIBUTER.
APPLICATION FILED JAN. 17, 1916.
1,289,419.
Patented Dec. 31, 1918.
2 SHEETS—SHEET 1.
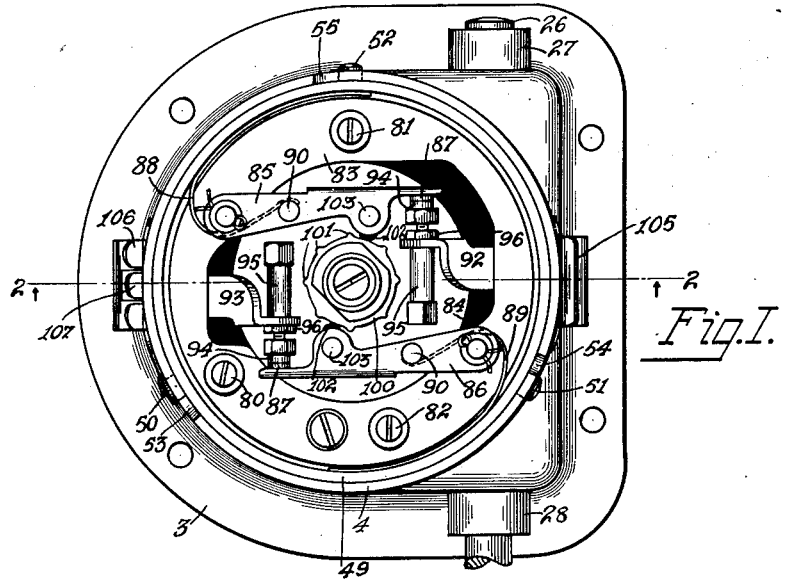
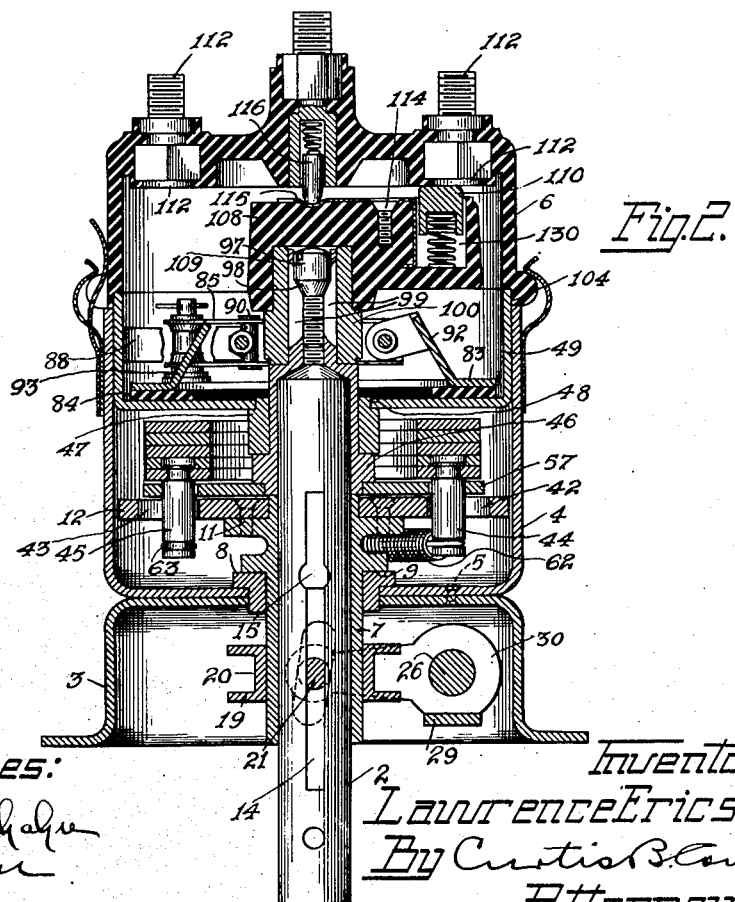
Witnesses:
Inventor:
Lawrence Ericson.
By Curtis B. Camp.
Attorney.

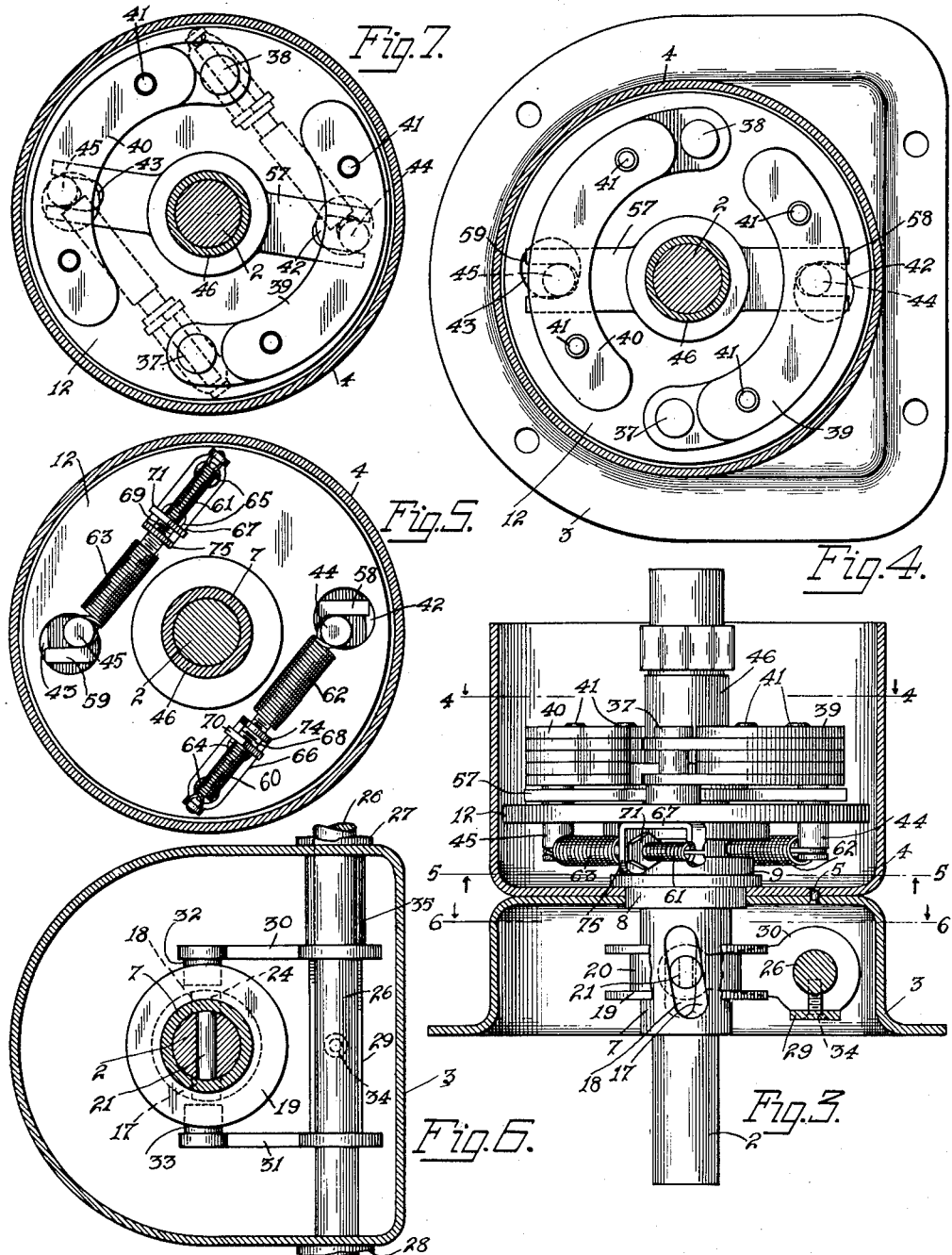

UNITED STATES PATENT OFFICE.

LAWRENCE ERICSON, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

IGNITION-DISTRIBUTER.

1,289,419.   Specification of Letters Patent.   Patented Dec. 31, 1918.

Application filed January 17, 1916. Serial No. 72,445.

*To all whom it may concern:*

Be it known that I, LAWRENCE ERICSON, a citizen of the United States of America, residing in Chicago, county of Cook, and State of Illinois, have invented certain new and useful Improvements in Ignition-Distributers, of which the following is a specification.

My invention relates to current controllers or ignition distributers for use in connection with internal combustion engines that are subject to various and sudden changes of speed, such as automobile engines, and more particularly relates to that type of distributer which operates to automatically advance and retard the spark furnished to the engine by the distributer in response to changes of speed of the engine.

The present distributers that are in commercial use are such that as the speed of the engine is increased the spark is automatically advanced in substantially direct ratio thereto. However, it has been found that an advance of this character does not give the best results, but that it is desirable to prevent the advance of the spark until the speed of the distributer shaft has reached a certain speed, for example 250 revolutions, then the spark should be advanced as the speed of the distributer shaft is increased until the speed of the distributer shaft has reached a predetermined speed, for example 950 revolutions. At this point the advance of the spark should be complete and it should not be advanced for any higher speeds of the distributer shaft. The arbitrary values given above have been taken for illustrative purposes only, as the point at which the advance of the spark commences and the point at which the advance of the spark should be complete is entirely regulated by the different types of motors or engines. Also the amount of advance, that is, the number of degrees that the timer cam is advanced in relation to the distributer shaft varies in the different type of motors. To obtain the best results and the maximum efficiency of a motor, it has been found that the advance of the timer cam should not be in direct ratio to the advance of the speed of the distributer shaft. That is, the advance of the timer cam in degrees from a speed of 300 revolutions of the distributer shaft to a speed of 350 revolutions will be different than the advance of the timer cam in degrees from a speed of 350 revolutions of the distributer shaft to a speed of 400 revolutions. Here again, the type of engine entirely regulates the required advance in degrees of the timer cam for a certain change in speed of the distributer shaft. That is, for correspondingly like changes in the speed of the distributer shafts of different motors, different degrees of advance of the timer cam are required.

It is the object of my invention to produce an improved device of the class described which will obviate the above-mentioned undesirable features and embody the above-mentioned desirable features and advantages all in a simple, efficient and economical manner, and to the accomplishment of this object and such others as may hereinafter appear, my invention consists in the novel details of construction, parts, and combinations of parts hereinafter described and particularly pointed out in the appended claims, forming a part hereof in which the same reference characters indicate like parts throughout the several views and in which:

Figure 1 shows a top view with the cover cap and distributer arm removed of the combined timer and distributer of my invention.

Fig. 2 is a sectional view along the line 2—2, of Fig. 1 with the cover cap and distributer arm in place;

Fig. 3 is a side view of the device showing the containing casing in section to more clearly show the mechanism contained thereon. The cover cap, the distributer arm and the cup containing the interrupter contacts have been omitted.

Fig. 4 is a sectional view along line 4—4, of Fig. 3;

Fig. 5 is a sectional view along line 5—5 of Fig. 3;

Fig. 6 is a sectional view along line 6—6 of Fig. 3;

Fig. 7 shows the weighted members of Fig. 4 in their operated positions.

Referring to the accompanying drawings, the mechanical construction of these parts including the timer cam and the distributer mechanism embodied compactly in one piece of apparatus, will now be described.

Suitably mounted upon the engine base in any desirable manner is an inverted cup member 3 that contains mechanism for manually advancing the spark as will be more fully hereinafter described. Secured to the cup 3 by means of rivets 5 is a cylindrical cup-shaped containing casing 4 that contains the automatic mechanism for automatically advancing and retarding the spark in response to changes in speed of the motor. Removably mounted upon the casing member 4 is an inverted cup-shaped cap 6 formed of insulating material.

Extending up into the containing casing 4 is a driving shaft 2 which is suitably connected to the engine shaft and geared to the proper ratio of movement to operate the timer and distributer in proper cycle. Extending lengthwise of the driving shaft 2 is a longitudinal slot 14 provided with an enlarged transverse circular orifice 15 near one end thereof. Surrounding the shaft 2 is a cylindrical sleeve member 7 which has bearing in a collar member 8 that is securely fitted into the bottom portion of the cup-shaped containing casings 3 and 4. To prevent longitudinal movement of the sleeve member 7, a shoulder 9 is provided that has bearing against the upper surface of the annular ring collar 8. A pair of helically shaped slots 17 and 18 are cut in the sleeve member 7 and provide means for changing the relation between the sleeve member 7 and distributer shaft 2, as will be more fully hereinafter described. Surrounding the sleeve member 7, within the casing 3, is a circular collar member 19 provided with an annular groove 20. A cylindrical pin 21 is provided with intermediate flattened sides to fit within the longitudinal slot 14 in the shaft 2 and extends through annular holes 24 in the collar 19 and through the helical slots 17 and 18 in the sleeve member 7. To insert the pin 21 in its position, the annular recess 15 in the shaft 2 is moved opposite the annular holes 24 in the collar 19. The said pin 21 is then inserted in a manner so that when the shaft is raised into its position the flattened portions of the pin 21 fit into the longitudinal slot 14 thereby preventing transverse movement of the said pin. Extending transversely through the casing 3 is a shaft 26 that has bearing in the collars 27 and 28 that are suitably fastened to the said casing 3. Within the casing 3 is a yoke member 29 provided with a pair of arms 30 and 31 that are provided with cylindrical roller members 32 and 33 respectively that fit within the groove 20 of the collar 19. The yoke member 29 is fastened to the shaft member 26 by means of screws 34. A surrounding sleeve 35 is provided for preventing transverse movement of the yoke member 29. Attached to the shaft 26 (not shown), is manual connecting means for rotating the shaft member 26. In response to the rotation of shaft 26 in a manner to raise the collar 19, the pin 21 operates to rotate the sleeve 7 in a counter-clockwise direction thereby changing its relation with the distributer shaft 2. When the shaft 26 is rotated in the opposite direction the collar 19 and pin 21 operate to rotate the sleeve member 7 in the opposite direction. The effect of manually changing the relation between the sleeve 7 and the distributer shaft 2 operates to advance or retard the spark in a manner to be more fully hereinafter described.

Securely fastened to the upper flanged portion of the sleeve 7 by means of screws 11, is a circular plate member 12 that carries the mechanism that operates to automatically advance the spark as the speed of the driving shaft is increased. Pivotally secured to the plate 12 at the outer periphery thereof by means of a pair of staked pins 37 and 38, is a pair of semi-circular laminated weighted members 39 and 40. The laminations that form the weighted members 39 and 40 are held together by means of rivets 41. To limit the operation of the weighted members 39 and 40, a pair of pins 44 and 45 are provided that are staked to the said weighted members and extend downwardly through circular orifices 42 and 43 in the circular plate 12. Loosely surrounding the upper portion of the shaft 2 is a cylindrical sleeve 46 that abuts against the sleeve member 7. Surrounding the sleeve 46 is a collar 47 which rotatably supports and forms a bearing for the said sleeve 46. The collar 47 is staked in an annular recess 48 in the bottom portion of the cup-shaped member 49 that carries the interrupter contacts. Pins 50, 51, and 52 that are staked in the cup member 49 fit into bayonet slots 53, 54 and 55 in the containing cup 4 for holding the said cup member 49 in place. Securely fastened to the bottom portion of the sleeve 46 is a transverse plate 57 that is provided with bifurcated end portions 58 and 59 into which fits the staked pins 44 and 45 of the weighted members 39 and 40.

To provide means to permit the weighted members to advance in the desired manner thereby advancing the spark in the desired manner, I provide a pair of relatively light coil spring members 60 and 61 and a pair of relatively heavy coil spring members 62 and 63. Secured to the bottom of the circular plate 12 by means of screws 64 and 65, is a pair of U-shaped members 66 and 67. One leg of each of the U-shaped members is arranged to receive one loop of the lighter coil springs 60 and 61. A circular recess is provided in each of the other legs 74 and 75 of the U-shaped members 66 and 67 through which extend cylindrical members 68 and 69 that are provided with hexagonal shaped portions 70 and 71, respectively. Each end of the cylindrical members 68 and 69 is threaded to receive one end of each of the light and heavy coil springs. The opposite ends of the heavy coil springs are fitted into grooves cut in the staked pins 44 and 45. The coil springs and the cylindrical members 68 and 69 are so arranged that when the weighted members move outwardly through the influence of centrifugal force the tension of the light weight coil springs 60 and 61 are acted upon until the hexagonal portion 70 engages the leg 74 of the U-shaped member 66 at which time the heavy coil spring 62 comes into operation and as the weighted members move on outwardly the hexagonal portion 71 of the cylindrical member 69 engages the leg 75 of the U-shaped member 67 at which time the other heavy coil spring 63 comes into operation. By this method of increasing the spring tension that operates upon the weighted members the desired amount at the desired time the sleeve member 46 can have its relation to the distributer shaft changed in the desired manner as will be more fully hereinafter explained.

Mounted within the cup 49 and secured thereto by means of screws 80, 81, and 82 is a contact-carrying ring 83. The contact ring is insulated from the cup 49 by means of a layer of insulating material 84. A pair of interrupter arms 85 and 86 are insulatingly pivoted, diametrically opposite each other, to the contact-carrying ring 83. Attached to the free extremity of each of the interrupter arms is a movable contact 87. To yieldingly hold the interrupter arms 85 and 86 in their normal positions, leaf springs 88 and 89 are provided, each of said springs being provided with a hooked end that fits around a pin 90 in its interrupter arm and is then bent around the pin that pivots its interrupter arm and lies against the inner surface of the said cup 49. Formed integrally with the contact carrying ring 83 is a pair of raised arms 92 and 93. Each of the said arms 92 and 93 carries a stationary contact 94 that is adjustably secured to the said arms by means of a pin 95 and a lock nut 96. The movable contacts 87 are normally in engagement with the said stationary contacts 94. The upper reduced portion of the sleeve 46 is drilled and tapped to receive a screw-threaded member 97 that is provided with a tapered head 98. Cut lengthwise in the said upper portion of the sleeve 46 is a number of slots 99 that extend through into the drilled and tapped hole. Loosely surrounding the upper portion of the sleeve 46 is mounted the timer cam 100 which is provided with a number of ribs 101 equal in number to the number of explosive chambers or cylinders of the motor. The timer cam may be adjustably secured in any position by tightening the screw 97 which operates through the medium of its tapered head to press the slotted side pieces of the extended end of the sleeve 46 outwardly to securely hold the said timer cam in place. When the timer cam is rotated the ribs 101 contact with the nose of the fiber members 102, which are secured to the contact arms 85 and 86 by means of rivets 103, to open and close the contacts 87 and 94 as the distributer shaft revolves. The cover cap 6 which is made of insulating material as hereinbefore mentioned, is provided with an inner annular recess 104 which is adapted to fit over the upper edge of the cup member 49 and abut against the upper edge of the casing 4. A pair of springs 105 and 106 are adapted to yieldingly hold the cap 6 in its position upon the cup casing while an upwardly extending spring 107 is provided to prevent rotation of the cap 6 in relation to the cup casing 4 when it is placed in its locked position.

A distributer arm 108 is provided with a recess 130 for securing it to the timer cam 100 so that when the timer cam 100 is rotated the arm 108 is rotated therewith. A cylindrical recess 109 is cut in the upper surface of the arm 108 into which is yieldingly fitted a cylindrical contact member 110 that is adapted to wipe over the contact terminals 112 of the head 6. A metallic strip 115 is secured to the upper surface of the arm 108 by means of a screw 114 and forms electrical connecting means for the contact terminal 110 to the contact pin 116 which is carried by the distributer cap 6. The contact terminal studs 112 extend through the upper surface of the distributer cap 6 into position to be engaged by the contact button 110 as the arm 108 is rotated. The threaded ends of the terminals 112 constitute the secondary terminals that connect to the cylinders that contain the explosive mixture ready for firing. At the same time that the contact button 110 is rotated over the contact terminals 112, the timer cam 100 is of course operated to open and close the timer contacts 87 and 94 to send impulses through the primary winding of the induction coil.

Referring now to the operation of the device, when the shaft 2 is rotated, due to its connection to the shaft of the engine, the surrounding sleeve 7 is rotated therewith through the medium of the transverse pin 21 which extends through the said sleeve 7 and shaft 2. The collar 20 is also rotated at the same time due to the said pin 21. The rotation of the sleeve 7 causes the circular disk 12 to be rotated, which operates to rotate the surrounding sleeve 46 through the medium of the pins 44 and 45 and the transverse slot plate 57 which is secured to the said sleeve 46. The rotation of sleeve 46 causes the timer cam to interrupt the contacts 87 and 94 to make and break a circuit through the primary of the induction coil. The rotation of the timer cam also causes the distributer arm 108 to be rotated thereby causing the contact button 110 to make contact with the contact studs 112 thereby distributing the secondary currents to the different cylinders of the combustion engine. If it is desired to manually advance or retard the spark, the collar 19 is raised and lowered as hereinbefore described. The raising and lowering of the ring 19 causes the pin 21 to either rotate the sleeve 7 forwardly and backwardly in its relation to the distributer shaft 2, changing the relation between the timer cam 100 and the distributer shaft 2, thereby advancing or retarding the spark. As the speed of the engine is increased the weighted members 39 and 40 move outwardly under the influence of centrifugal force causing the pins 44 and 46 staked to the weighted members to turn about their pivot points thereby causing the transverse plate 57 to be rotated forward in reference to its relation with the circular plate 12 causing the timer cam to be advanced thereby causing the interrupter contacts to be operated to transmit impulses to the primary of the induction coil in advance of the impluses that would have been transmitted had the timer cam not been advanced. Conversely, as the speed of the distributer shaft is decreased the weighted members are forced inwardly thus causing the timer cam to move backwardly in relation to its position with the distributer shaft thereby retarding the spark.

From the foregoing description it is apparent that the spring tension of the light and heavy coil springs is so arranged as to prevent the advance of the spark until a predetermined speed is reached, and that by then increasing the spring tension at the desired speed of the distributer shaft the advance of the spark can be regulated as desired.

While I have described one form of mechanism well adapted to accomplish the objects sought, it is to be understood that various other forms might be utilized to accomplish the desired results. Therefore, I do not wish to be limited to the exact structure as shown, as many changes and modifications may readily suggest themselves, but I aim to cover all such changes and modifications as come within the spirit and scope of the appended claims.

Having described my invention, what I desire to claim as new and secure by United States Letters Patent, is:

1. In a device of the character described, the combination with a rotary driven element, of a spark controlling member, a disk rotatable with said rotary member and connected to said spark controlling member, a pivoted centrifugal member carried by said disk, a pin secured to said centrifugal member and extended through an orifice in said disk, and a plurality of different gage coil springs connecting said pin to said disk, said springs being so arranged as to permit equal increments of movement of the spark controlling member for unequal changes in the speed of rotation of said rotary element.

2. In a device of the character described, the combination with a rotary driven member adapted to be rotated at different speeds, of an electrical device including a contact operator and a spark distributer, a plate rotatable with said rotary member, a centrifugal member pivoted to said plate, a pin connected to said centrifugal member, a plate connected to said electrical device and provided with a slot adapted to receive said pin, and a plurality of coil springs connecting said pin with said first plate, said springs being adapted to be successively brought into operation in a manner to permit said electrical device to change its angular position in respect to said rotary device different amounts throughout a given range for equal changes in the speed of rotation of said rotary device.

3. In an ignition system for internal combustion engines; the combination of an electrical contact controller adjustable throughout a given range of advance and retard; of a rotary shaft associated with said contact controller adapted to be rotated at various speeds; a disk rotatable with said shaft, a centrifugally controlled device pivoted to said disk, a pin secured to said centrifugally controlled device, a member connected to said contact controller and provided with a slot to receive said pin, a plurality of coil springs tending to hold said contrifugally controlled device in its normal position, said springs being arranged to be successively brought into operation to oppose movement of said centrifugally controlled device, for adjusting said electrical device variable distances for equal increases in the speed of rotation of said rotary shaft.

4. A device of the character described including a rotary member adapted to be driven at various speeds, a contact controller connected to and rotatable with said rotary member and adapted to have its angular relation in respect to said rotary member changed during the rotation of said rotary member, a disk secured to said rotary member, centrifugally controlled means pivotally secured to said disk, pins secured to said centrifugally controlled means, a member connected to said contact controller and provided with slots adapted to receive said pins, and a plurality of coiled springs having different resisting forces connecting said pins to said rotary disk whereby the angular relation between said contact controller and said rotary member is changed varying amounts for equal changes in the speed of rotation of said rotary member.

5. A device of the character described including a rotary member adapted to be driven at various speeds, a contact controller connected to and rotatable with said rotary member and adapted to have its angular relation with said rotary member changed during the rotation of said rotary member, centrifugally controlled means located between said rotary member and said contact controller, a plurality of coil springs having different resisting forces connecting said rotary member to said centrifugally controlled means whereby the angular relation between said contact controller and said rotary member is changed varying amounts for equal changes in the speed of rotation of said rotary member, and manually controlled means for changing the angular relation between said rotary driven member and said contact controller.

6. A device of the character described including a rotary driven device adapted to be rotated at various speeds, a contact operator rotatable with said device and arranged to have its angular position in respect to said rotary device changed, a centrifugal element carried by said rotatable device connecting said rotary device to said contact operator, a plurality of coil springs having different resisting forces adapted to be successively brought into operation as said centrifugal element has its position changed, said springs being arranged to maintain said centrifugal element in its normal position when said rotary device is at rest and to operate upon said centrifugal element in such a manner as to allow said contact operator to change its relation to said rotary device equal amounts for unequal changes in the speed of rotation of said rotary device, and manually controlled means for changing the angular relation between said rotary driven device and said contact operator.

7. A device of the character described including a rotary member adapted to be rotated at various speeds, a contact operator rotatable with said rotatable member but adapted to have its angular relation with said rotary member changed for varied speeds of rotation of said rotary member, mechanism including centrifugally controlled members and coil springs having different resisting forces operating to prevent centrifugal force from moving said centrifugal members, connecting said contact operator with said rotary element whereby when the speed of rotation of said rotary element is changed at a constant rate the angular position between said contact operator and said rotary element is changed at a varied rate, and manually controlled means for changing the angular relation between said rotary driven device and said contact operator.

8. In a device of the character described, the combination with a rotary driven member adapted to be rotated at different speeds, of an electrical device including a contact operator and a spark distributer, a plate rotatable with said rotary member, a centrifugal member pivoted to said plate, a pin connected to said centrifugal member, a plate connected to said electrical device and provided with a slot adapted to receive said pin, a plurality of coil springs connecting said pin with said first plate, said springs being adapted to be successively brought into operation in a manner to permit said electrical device to change its angular position in respect to said rotary device different amounts throughout a given range for equal changes in the speed of rotation of said rotary device, and manual means including a slidable member provided with a helical slot for changing the angular relation between said rotary driven member and said electrical device.

9. In a device of the character described, the combination with a rotary driven element, of a spark controlling member, a disk rotatable with said rotary member and connected to said spark controlling member, a pivoted centrifugal member carried by said disk, a pin secured to said centrifugal member and extended through an orifice in said disk, a plurality of different gage coil springs connecting said pin to said disk, said springs being so arranged as to permit equal increments of movement of the spark controlling member for unequal changes in the speed of rotation of said rotary element, and manual means including a slidable member provided with a helical slot for changing the angular relation between said rotary driven member and said spark controlling member.

10. A device of the character described including a rotary member adapted to be driven at various speeds, a contact controller connected to and rotatable with said rotary member and adapted to have its angular relation in respect to said rotary member changed during the rotation of said rotary member, a disk rotatable with said rotary member, centrifugally controlled means pivotally secured to said disk, pins secured to said centrifugally controlled means, a member connected to said contact controller and provided with slots adapted to receive said pins, a plurality of coiled springs having different resisting forces connecting said pins to said rotary disk whereby the angular relation between said contact controller and said rotary member is changed varying amounts for equal changes in the speed of rotation of said rotary member, and manual means for changing the angular relation between said disk and said rotary member.

Signed by me at Chicago, county of Cook and State of Illinois, in the presence of two witnesses.

LAWRENCE ERICSON.

Witnessess
 Wm. Berghahn,
 B. O'Brien.